March 28, 1961 W. H. P. POULIART ET AL 2,977,574

ELECTRICAL COMPARATOR

Filed Jan. 28, 1957

Inventors
W. H. P. POULIART
G. VAN MECHELEN
By Robert Harding Jr.
Attorney

United States Patent Office 2,977,574

Patented Mar. 28, 1961

2,977,574

ELECTRICAL COMPARATOR

Willy Hortense Prosper Pouliart and Guillaume Van Mechelen, Antwerp, Belgium, assignors to International Standard Electric Corporation, New York, N.Y., a corporation of Delaware Filed Jan. 28, 1957, Ser. No. 636,630

Claims priority, application Netherlands Jan. 31, 1956

3 Claims. (Cl. 340—149)

Figure 1:
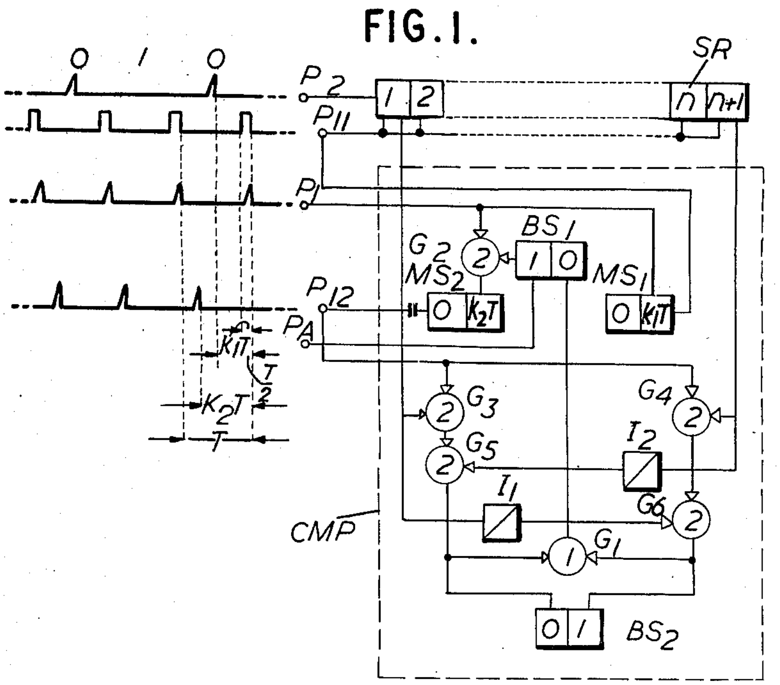

The invention relates to an electrical comparator and more particularly to a comparator for comparing two numbers electrically represented each by means of $n$ binary digits.

Such a comparator has already been disclosed in the U.S. patent to P. R. Aigrain, No. 2,752,489. In this patent all pairs of digits of the same order for both numbers are simultaneously compared and the device is made to react upon all pairs of such digits being complementary.

An object of the invention is to provide an electrical comparator able to compare sequentially pairs of binary digits from two numbers and having corresponding orders.

Such a method has the advantage that the interconnections between the electrical circuits characterising the various binary digits of the two numbers can be substantially reduced by avoiding a simultaneous comparison of all pairs of binary digits.

It is to be noted that in the U.S. Patent No. 2,660,372, an arrangement has already been described for comparing two digits, the value of each digit being characterised by a pulse which appears at a particular time in accordance with the value of the digit. The arrangement is such that it does not react to simultaneous pulses indicating two equal digits but that it reacts in one way or the other upon a single pulse being applied to one of its two inputs, the further pulse characterising the other digit being then ineffective. Reaction of the arrangement in one or the opposite way will thus indicate which digit is higher than the other.

Another object of the invention is to provide a comparator such that equipment for the storage of twice the number of digits of each number is avoided, the storage equipment being substantially reduced to that necessary for recording the digits of a single number only.

Another object of the invention is to provide a comparator such that comparison between two pulses of substantially the same length is avoided, a short pulse being always compared to a substantially longer pulse covering said short pulse.

Another object of the invention is to provide a comparator which is substantially immune to phase shift between the time base controlling successive comparisons between pairs of digits and other pulses characterising the digits.

In accordance with a feature of the invention, an electrical comparator for comparing two numbers, each electrically represented each by means of $n$ binary digits, wherein a single digit comparator is used capable of determining whether a binary digit from one number is greater than, smaller than, or equal to, the binary digit of even rank of the other number, is characterised by the repeated use of said single digit comparator for all pairs of binary digits of the two numbers, by the provision of a pattern shift register with a number of stages at least equal to $n+1$, in which the first number is originally stored on the first $n$ stages thereof, by the application of advancing pulses to said register, each advancing pulse displacing the pattern representing the first number by one stage, in synchronism with information pulses characterising the second number applied to the first stage of said register, the presence or the absence of a pulse corresponding to the one or the other value for the corresponding binary digit of the second number, and by the two inputs of said comparator being respectively associated with two stages of said register separated by $n-1$ intermediate stages.

Figure 2:
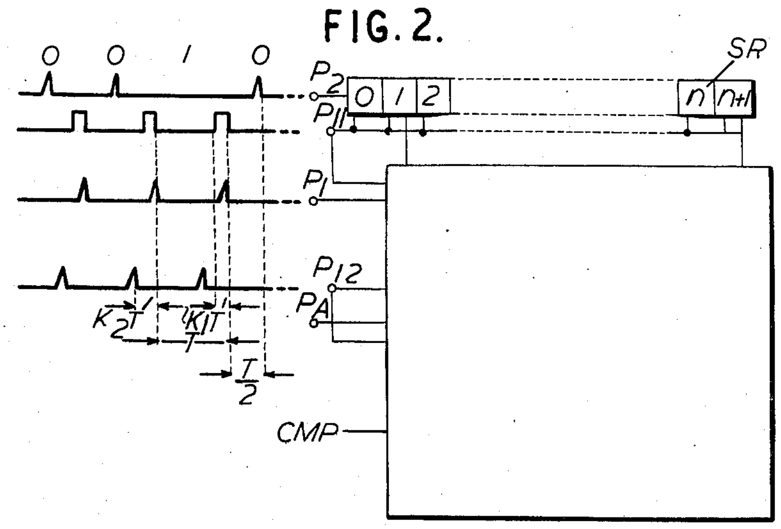

The above mentioned and other objects and characteristics of the invention will be better understood by referring to the following description of embodiments of the invention to be read in conjunction with the accompanying drawings which represent:

Fig. 1, a first embodiment of the invention;

Fig. 2, a second embodiment of the invention.

Referring to Fig. 1, a pattern shift register SR has been shown to comprise a plurality of $n+1$ stages. This pattern shift register may for example be designed, as shown in the U.S. Patent No. 2,649,502, issued to A. D. Odell. Each square representing a stage of the shift register can assume two distinct electrical conditions, and, accordingly, the register shown can be used to record a number electrically represented by $n$ binary digits plus an additional binary digit. The pattern shift register is such that upon advancing pulses being applied to all of its stages, each stage assumes the condition of the previous one. In other words, the pattern of electrical conditions recorded on said register is advanced by one stage by each of the advancing pulses. As disclosed in the above mentioned U.S. patent, each stage may essentially include a cold cathode tube which may be ionized or not, and the advancing pulses will be applied to the cathodes of all the tubes in such a way as to de-ionize all the previously ionized tubes and leave the non-active tubes de-ionized. Upon the disappearance of the advancing pulse, those tubes which had previously been ionized will still provide a transient pulse in their anode circuit which will be sufficient to cause the ionization of the next tube forming the next stage, a suitable coupling between the anode circuit of any tube and the control circuit of the next tube being provided.

Fig. 1 also shows a comparator CMP which is shown to include gates, bistable and monostable devices, and inverters. All the gates, such as $G_1$ or $G_2$, have two input conductors terminated by arrows pointing towards the centre of the circle, representing the gate, and one output conductor. The numeral 1 inside the gate $G_1$ indicates that the latter is a mixer or an "or" gate which delivers an output signal upon an input signal being provided at one or both input conductors. On the other hand, the numeral 2 inside the gate, such as $G_2$, indicates that the latter is of the coincidence or "and" type requiring the simultaneous application of signals at the two inputs to cause an output signal to be delivered. The bistable device, such as $BS_1$, is represented by a rectangle divided into two squares: one labelled 0 and the other 1, corresponding with the two stable conditions. The input conductors to such bistable devices are always shown to arrive against the long sides of the rectangle while the output conductors are derived from the short sides. The monostable devices, such as $MS_1$, are shown in a manner similar to the showing of the bistable device, but whereas one square is indicated by 0, the second bears an indication, such as $k_1T$, indicating the time constant of the circuit, i.e. the time it takes to return to its stable condition after having been triggered into its off-normal condition. The inverters, such as $I_1$, are represented by a square crossed by a diagonal and will invert the signal in such a way that a signal which would normally tend to energise a gate or other device will no longer have that quality at the output of the inverter, whereas on the other hand, when a signal representing a non-active condition is applied to the input of an inverter it becomes an active signal at the output. In the remaining part of the description, signals will be understood as those potentials which can be active to energise other devices.

The comparator CMP is controlled from stage 1 and stage $n+1$ of SR. It is also controlled by a potential condition which may be applied to terminal $P_A$. Finally, it is fed by clock pulses which appear at terminal $P_1$ and the wave form of which is shown next to that terminal.

It will be assumed that a first number to be compared with a second number will first be fed into SR. It will be further assumed that the first as well as the second number are represented by a succession of pulses which will be applied to terminal $P_2$. The presence of a pulse within a time unit of period T may, for example, correspond to the binary digit 0 while the absence of such a pulse corresponds to the binary digit 1. Such a scheme of representation is particularly useful for recording on magnetic materials. It is clear that such a way of representing information necessitates clock or synchronising pulses which have been shown to be applied to terminal $P_1$. The period of such clock pulses is also equal to T and they are shown to be phase shifted with respect to the eventual information pulses appearing at terminal $P_2$ by an interval of time equal to $$\frac{T}{2}$$

In fact, the wave forms show that the first clock pulse to be applied will precede a first information pulse corresponding to a first binary digit 0 by a time $$\frac{T}{2}$$

Both the information and the clock pulses may be thought of as having been derived from magnetic tape provided with two corresponding tracks on which information has been registered by magnetizing in one or the other direction successive bits of tape. A reversal of the sense of magnetisation will cause a pulse to be delivered to the reading head corresponding to the track. After a suitable amplifying and shaping process such as the one described in U.S. patent to W. Pouliart, No. 2,704,261, corresponding wave forms exhibiting sharp trigger pulses will be obtained and applied to terminal $P_1$ (for the clock pulses) and to terminal $P_2$ (for the information pulses).

When the first number is fed to terminals $P_1$ and $P_2$ in this manner, it will be assumed that $BS_1$ is in its 0 or reset condition whereby gate $G_2$ is blocked.

The first clock pulse to arrive at terminal $P_1$ will trigger $MS_1$ to its off-normal condition for a time $k_1T$ whereby a pulse of duration $k_1T$ will appear as shown at terminal $P_{11}$. This is the terminal connected to all the stages of SR and it is desirable for the correct advancement of any other pattern registered on SR that the advancing pulses at terminal $P_{11}$ should have some predetermined duration. As shown, $k_1T$ will in general be much smaller than T. For a pattern shift register of the type disclosed in U.S. Patent No. 2,649,502, referred to above, $k_1T$ should be sufficiently long so that all the tubes of SR which are ionized can be de-ionized, and sufficiently short that upon the disappearance of the advancing pulse the pulse generated in the anode circuit of a tube which was de-ionized will still be sufficient to cause the energisation of the next tube in the chain.

Prior to the arrival of the first digit of the first number, the pulses at $P_{11}$ will eventually deionize all the stages of SR. When all the stages are de-ionized, the continued application of pulses at $P_{11}$ will have no effect on the register, since the condition of a preceding stage having been ionized is not met. The first digit of the first number will arrive at the first stage of SR and either ionize it or not, depending on whether the digit is a "1" or a "0." If it is not ionized, the next pulse at $P_{11}$ will have no effect; if it is ionized, the next pulse at $P_{11}$ will de-ionize the first stage, and at the end of the pulse, the second stage will be ionized, thus moving the first digit from the first stage to the second. Each pulse at $P_{11}$ will cause the incoming digits to shift one stage to the right until all the digits have been received, whereupon all the stages from one to $n$ will either be ionized or de-ionized in accordance with the value of the digits of the number. It is then clear, that the first number will be inserted, into SR, digit by digit, and after a time $n$T, the first number represented by $n$ binary digits will be registered on the first $n$ stages of SR.

The second number can now be fed into SR on the trail of the first number, the first number being shifted towards the right as the digits are received. The comparator CMP should now be made active to compare the two numbers. A suitable potential will be applied at terminal PA to place $BS_1$ in its 1 condition.

The first clock pulse accompanying the eventual information pulses characterising the second number will then not only produce a corresponding pulse of duration $k_1T$ at terminal $P_{11}$, but it will also pass through $G_2$ to trigger $MS_2$ into its off-normal condition for a time $k_2T$. As indicated by the condenser coupling between $MS_2$ and terminal $P_{12}$, the return of $MS_2$ to its stable condition after a time $k_2T$ will be used to generate a reference pulse, the wave form of which is shown next to terminal $P_{12}$. Hence, $MS_2$ is used as a delay circuit.

From terminal $P_{12}$, which has been brought out of CMP merely for the purpose of showing the corresponding waveform, the reference pulse is applied to inputs of the gates $G_3$ and $G_4$. One will note that the time $k_2T$ is chosen larger than $$\frac{T}{2}$$

and smaller than T. This means that when the first pulse appears at terminal $P_{12}$, the information pulse characterising the first binary digit of the second number has already been able to trigger the first stage of SR, and since this has occurred after the first pulse at terminal $P_{11}$, the $n$ digits of the first number are now registered in the last $n$ stages of SR, the first digit of the first number being recorded in stage $n+1$. Hence, CMP is able to compare the first digits of the two numbers. If these are the same, it is clear that only two situations can arise. Either the comparison pulse at terminal $P_{12}$ is able to go through the gates $G_3$ and $G_4$ but unable to go through the gates $G_5$ and $G_6$ or in the second case, it would be able to pass through the gates $G_5$ and $G_6$ but the gates $G_3$ and $G_4$ are blocked. Hence, no pulses will be delivered either at the output of $G_5$ or at the output of $G_6$.

If a 0 is registered in stage 1 of SR whereas a 1 is registered in stage $n+1$ of SR, it will be assumed that a signal appears at the control input of $G_3$ and at the input of $I_1$, whereas no such signal appears at the control input of $G_4$ and at the input of $I_2$. Hence, gates $G_3$ and $G_5$ are the two which become unblocked and the reference pulse at terminal $P_{12}$ passes through $G_3$ and $G_5$ in series to trigger the bistable device $BS_2$ into its 0 condition, this indicating that the first digit of the second number is smaller than the first dgit of the first number.

It is clear that if one has to determine which of the two numbers is greater than the other, or eventually the equality between the two, the binary numbers which represent the original numbers should be in the same order as these original numbers which may be in any radix whatever. This does not imply that the numbers are actually registered in radix 2 but merely that the weights assigned to the various binary digits should either be in the ascending or descending order.

If it is assumed that the first binary digit of each number is the one having the highest weight whereas the last has the smallest weight, it is evident that as soon as $BS_2$ has received a reference pulse causing triggering in one or the other condition, the result of the comparison between the two numbers is already registered by the condition of $BS_2$ and it is necessary that further comparisons between further corresponding digit orders of the two numbers should not result in further triggering of $BS_2$. This is achieved by the bistable device $BS_1$ which will immediately be triggered into its 0 condition upon a reference pulse appearing either at the output of $G_5$ or at the output of $G_6$ and being fed to its 0 input through the "or" gate $G_1$. The bistable device $BS_1$ will then block $G_2$ and the next clock pulse at terminal $P_1$ which will follow the triggering reference pulse by a time $(1-k_2)$ T will not be able to trigger $MS_2$.

Should the reverse order have been used for representing the two numbers, then it will be the last comparison pulse able to appear either at the output of $G_5$ or at the output of $G_6$ which will determine which number is higher than the other. In such a case, it is clear that the gate $G_1$ should be suppressed.

In this reverse order of the numbers, when the $n$ binary digits representing the second number have been fed to SR, the first $n$ stages of the latter register this second number, the last digit being in the first stage, while the last digit of the first number is still registered in the last stage $(n+1)$ of SR. The bistable device indicates by its condition which of the two numbers is greater than the other.

If the two numbers are equal, $BS_2$ will have received no pulse and will have remained in its original reset condition, e.g. 0. On the other hand, in such a case, $BS_1$ will not have been triggered back to its 0 condition and the fact that it is still in the 1 condition may therefore be used as an indication of the equality between the two numbers. In other words, if $BS_1$ is in its 1 condition at the end of a digit comparison, it is an indication that the digits being compared are equal, but if it is in its 0 condition, then the condition of $BS_2$ will indicate which is the larger of the two digits. The bistable device $BS_1$ may be reset to its 0 condition by means not shown.

Considering Fig. 1, and as already mentioned, $k_2$T must be greater than $$\frac{T}{2}$$

and smaller than T in order that the reference pulse is effective only after a corresponding information pulse has been fed to the pattern register but before the next advancing pulse transfers the pattern forward by one stage. Hence, the monostable device $MS_2$ which is responsible for producing the delay $k_2$T should be designed with sufficient accuracy so that the delay between a clock pulse and the reference pulse derived therefrom should stay within the prescribed limits. This is not particularly difficult to achieve when the phase relation between the information pulses and the clock pulses is assumed to remain constant or substantially constant. For example, if the information characterising the numbers comes from a magnetic drum storage arrangement, the latter may be provided with a special track on which the clock pulses are engraved. A high positional accuracy can be obtained for the clock pulses in this manner, and as the information pulses will be originally stored on an ordinary track of the magnetic drum under the control of the clock pulses obtained from that drum, it is not difficult to ensure that the proper phase relationship between the information and the clock pulses will be maintained when information is read from the magnetic drum for the purpose of making comparisons in the manner disclosed by Fig. 1. Using a magnetic tape with two tracks, one for the information and the other for the clock pulses will in general also permit the maintenance of a suitable phase relationship between the two types of pulses.

One may however have to consider that the magnetic information is inscribed on individual documents, such as cheques, or on a piece of magnetic tape which is associated with a so called jacket in which the actual cheque is inserted. The magnetic marks either on the cheque itself or on the piece of magnetic tape associated therewith might then represent the corresponding account number for the cheque as well as the amount thereof. In such a case, when reading the magnetic information inscribed either on the document or on the document carrier, it is rather difficult to insure that the mechanisms which will provide a relative displacement between the document or the document carrier and the magnetic reading heads will be sufficiently accurate to avoid any angular displacements between the imaginary line going through the airgaps of the two magnetic heads reading the information and the clock tracks, and the line corresponding to the direction of relative displacement between the document and the reading heads. Also, when a document carrier supporting both the document and a piece of magnetic tape on which the two tracks are marked is used, there might be no difficulty in keeping the carrier moving or being scanned without appreciable changes of directions, but the piece of magnetic tape might well become displaced with respect to the document carrier. It should be remembered that even very small displacements have to be considered since magnetic recording generally implies the use of very closely packed signals, i.e. reversals of sense of magnetisation, which may be as close as 0.10 millimeter apart.

Hence, if the information was originally printed on the magnetic tape in such a way that the clock pulses are exactly out of phase with the eventual information pulses, when simultaneously reading these two tracks, the slightest angular displacement between the lines mentioned above may mean an undesirable departure from the phase shift of $$\frac{T}{2}$$

between the two series of pulses which are simultaneously read. In other words, the eventual information pulses might, for instance, lag behind the corresponding clock pulses by more than $$\frac{T}{2}$$

and even to such an extent that they might appear after the corresponding reference pulse, especially if $k_2$T happens to be below the specified exact value. In such circumstances, it therefore becomes imperative not only to secure very accurately designed mechanical equipment but also very close tolerances for the time constants of the monostable devices such as $MS_2$ resulting in an increased cost of the equipment.

The comparator arrangements shown in Fig. 2 permits working with wider tolerances. It will be recognised that the arrangement of Fig. 2 is exactly similar to that of Fig. 1 except that an additional stage labelled 0 has been added to the pattern shift register SR in front of stage 1. Stages 1 and n+1 of SR are still used as inputs to the comparator CMP the details of which are not shown in Fig. 2, since it is identical to the circuit shown in Fig. 1.

The pulse wave forms adjacent to terminals $P_1$ and $P_2$ show a difference with respect to those represented in Fig. 1 in that the clock pulses are now lagging by $$\frac{T}{2}$$

behind the corresponding eventual information pulses.

When the first number is fed to SR in the manner previously explained in relation to Fig. 1, after the $n$ clock pulses applied at terminal $P_1$, the pattern representing the first number will be stored on the $n$ stages of SR from stage 1 to stage $n$ included. When the comparator CMP is made effective by applying a suitable pulse at terminal $P_A$, and when the second number is fed to SR, the first digit will first be registered on stage 0 of SR and after a time $$\frac{T}{2}$$

it will be shifted to stage 1. From that moment, the comparison between the first two digits of the two numbers can be made, but the interval of time $k_2T$ by which the reference pulse lags behind the corresponding clock pulse at terminal $P_1$ is now much less critical, since it should now be greater than $k_1T$ but only smaller than T. As shown by the wave form appearing at terminal $P_{12}$ in Fig. 2, a relatively small value for $k_2T$ has been chosen, which is about half as large as $k_1T$, and the actual deviations from the specified value for $k_2T$ will be quite small even if they are appreciable percentage wise. Also, changes in the phase relationship between the pulses appearing at terminals $P_1$ and $P_2$ can be much larger than with the arrangement shown in Fig. 1. Hence, at the cost of one additional stage for the pattern shift register SR, one obtains the advantage of being able to work with wider tolerances both for the electronic and the mechanical equipment. The addition of one stage to SR will evidently not be an appreciable increase when the number of stages is large.

It should be appreciated that the use of sharp reference pulses avoids any comparison between pulses of substantially the same length which generally means a critical arrangement, but on the other hand the short reference pulse is always gated by pulses which have a much longer time duration and always cover the position of the short pulse.

While the principles of the invention have been described above in connection with specific apparatus, it is to be clearly understood that this description is made only by way of example and not as a limitation on the scope of the invention.

We claim:

1. Electrical comparator for comparing two numbers electrically represented by means of $n$ binary digits comprising a single digit comparator having two inputs and being able to determine whether a binary digit applied to one input from one number is greater than, or smaller than, or equal to, the binary digit of the same order of the other number applied to the other input, means for feeding pairs of information pulses sequentially into said comparator, said pairs of pulses representing pairs of digits of equal order from the two numbers, the presence or absence of an information pulse corresponding to one or the other value for the corresponding binary digit, said means comprising a pattern shift register having a number of stages equal to $n+1$, means for originally storing the digits of the first number on the first $n$ stages of said register, means for applying advancing pulses to said register in synchronism with information pulses characterizing the binary digits representing the second number, whereby said second number is fed into said register digit-by-digit as said first number is passed digit-by-digit through the $n+1$ stage of said register, the two inputs of said comparator having gating means respectively connected with the outputs of stages of said register which are separated by $n-1$ stages, means coupling said advancing pulses to said gating means, and indicating means connected to the output of said gating means for indicating which of each pair of compared information pulses represents the greater digit or whether said digits are equal.

2. Electrical comparator, as claimed in claim 1, in which the information pulses lag behind the advancing pulses, the means for applying advancing pulses to said register comprising means for producing reference pulses, one from each of said advancing pulses and following the latter with a delay greater than the delay between the advancing pulse and the following information pulse but smaller than the period of the pulses, the indicating means including bistable means, and means for causing outputs from said gating means to trigger said bistable means into one or the other condition, depending on whether a binary digit of one number is greater or smaller than the binary digit of even order of said other number.

3. Electrical comparator, as claimed in claim 1, wherein the register comprises an additional stage to give $n+2$ stages and the information pulses lead the advancing pulses, the means for applying advancing pulses to said register comprising means for producing reference pulses, one from each of said advancing pulses and following the latter with a delay smaller than the period of said pulses, the indicating means including bistable means, and means for causing said reference pulses to trigger said bistable means into one or the other condition, depending on whether a binary digit of one number is greater or smaller than the binary digit of even order of said other number.

References Cited in the file of this patent

UNITED STATES PATENTS

| | | |
|---|---|---|
| 2,700,755 | Burkhart | Jan. 25, 1955 |
| 2,735,082 | Goldberg | Feb. 14, 1956 |
| 2,775,418 | Townsend | Jan. 1, 1957 |
| 2,889,534 | Lubkin | June 2, 1959 |
| 2,900,620 | Johnson | Aug. 18, 1959 |